Dec. 5, 1939.    J. G. AMES    2,182,106

VENTING MEANS FOR RANGES OR THE LIKE

Filed Jan. 10, 1938    2 Sheets-Sheet 1

Inventor
James G. Ames
by McCauley Dawson & Booth
Attorneys

Dec. 5, 1939.   J. G. AMES   2,182,106
VENTING MEANS FOR RANGES OR THE LIKE
Filed Jan. 10, 1938   2 Sheets-Sheet 2

Inventor
James G. Ames
by McCoulsey Dawson & Root
Attorneys

Patented Dec. 5, 1939

2,182,106

UNITED STATES PATENT OFFICE 2,182,106

VENTING MEANS FOR RANGES OR THE LIKE

James G. Ames, Aurora, Ill., assignor to Autogas Corporation, Chicago, Ill., a corporation of Delaware Application January 10, 1938, Serial No. 184,187

13 Claims. (Cl. 126—299)

This invention relates to venting means for ranges or the like and more particularly to automatically controlled venting means for gas ranges or stoves.

It is highly desirable in connection with cooking stoves to provide ventilating means to remove cooking odors, volatilized grease, steam and the like from the kitchen and also to remove the heat of the stove to prevent undesired heating of the kitchen. This is particularly true in the case of stoves burning gas or other combustible fuel in which case it becomes additionally desirable to remove the combustion products which might otherwise escape into the kitchen.

If such venting means is provided for manual control the housewife or other operator is apt to forget to turn it on or off, thereby causing an undesired accumulation of cooking odors, hot gases and the like in the kitchen or operating the device unnecessarily with resultant waste.

It is accordingly one of the objects of the invention to provide venting means for ranges or the like which is controlled automatically by operation of the range. Preferably the venting means includes a vent pipe connected to the range oven and to a hood overlying the top burners with a fan or blower in the pipe to cause a circulation therethrough.

Another object of the invention is to provide venting means for a gas range or the like which is automatically controlled in accordance with the rate of gas supply to the range. According to one feature of the invention the control is such that it will pass sufficient gas to operate pilots or the like without operating the venting means but will operate the venting means whenever the gas supply is increased as when a burner is turned on.

Another object of the invention is to provide a flow responsive control device which is simple in construction and positive and reliable in operation.

Other objects, advantages and novel features of the invention will be apparent from the following description when read in connection with the accompanying drawings, in which.

Figure 1:
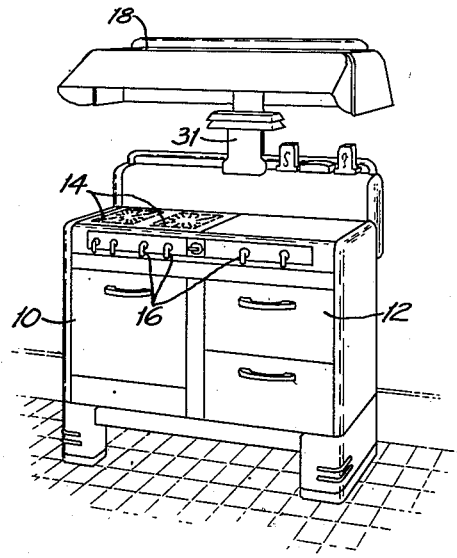
Figure 1 is a perspective view of a gas range embodying the invention.
Figure 2:
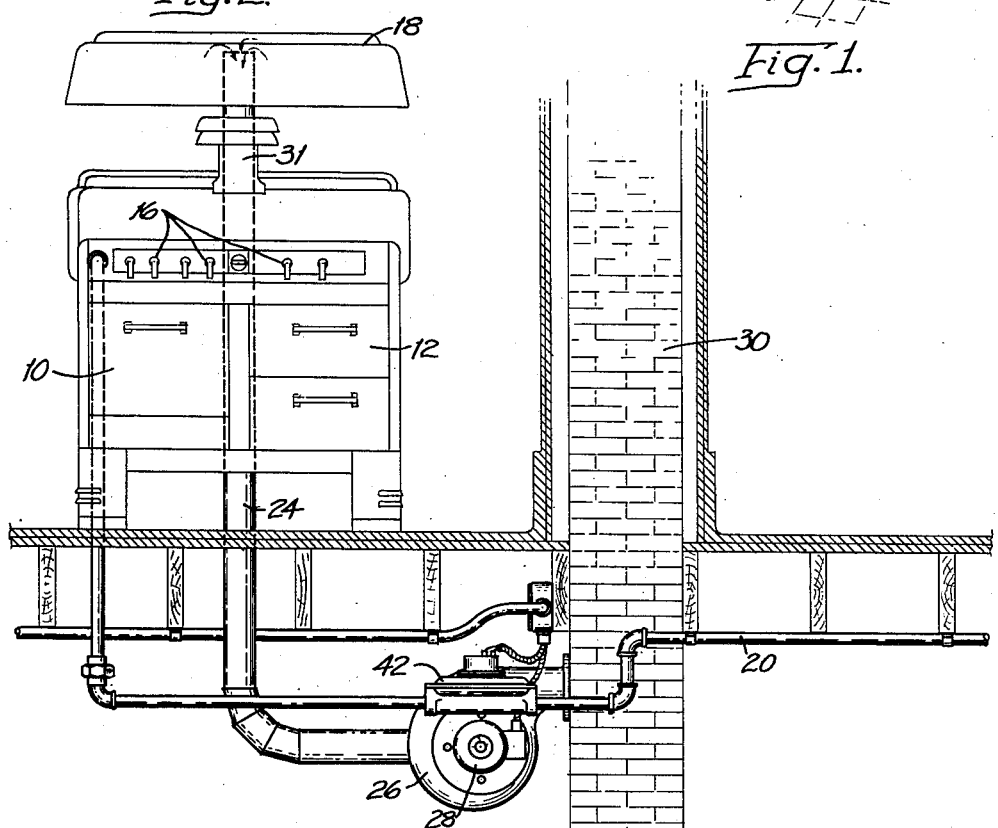
Figure 2 is a partial section through a building illustrating the gas range installation of Figure 1.

The range illustrated in Figures 1 and 2 comprises a baking oven 10, a broiling oven 12 and a flat top carrying a plurality of burners indicated at 14. Suitable valve control handles 16 are provided for the oven and top burners respectively to control the supply of gas thereto.

Figure 3:
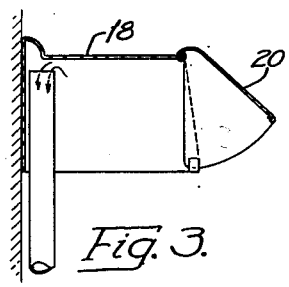
Figure 3 is a partial section showing the hood mounting.

The range is shown resting on the floor against one wall of a kitchen or the like with a hood 18 secured to the wall above the top of the range. As best seen in Figure 3 the hood has a pivotally mounted front portion 20 which may be swung in or out as desired. While the particular hood shown is well adapted for the type of range illustrated, it will be understood that various other types of hoods such as one carried directly by the range itself could be used equally well.

Gas is supplied to the range from a suitable supply pipe 22 shown in Figure 2 as lying under the kitchen floor and extending up therethrough and connected to the range.

In order to vent the range and to remove from the kitchen all objectionable cooking odors, steam, heat, etc., there is provided according to the present invention a vent pipe 24 leading from a point within the hood 18 down back of the range and through the floor to the inlet of a blower 26 driven by an electric motor 28.

The blower may discharge into a flue or stack 30 as shown in Figure 2 or, if more convenient, may discharge through a window or the like directly to atmosphere. It will be apparent that when the blower is running all steam, combustion products, cooking odors, etc., will be withdrawn from the kitchen in addition to a certain amount of air to insure ventilation of the kitchen.

The ovens are vented in the range illustrated by providing a vertical oven vent 31 terminating just under the hood 18 so that all combustion products and other gases and vapors will rise directly into the hood to be removed through the vent pipe. In a range of the type having an oven vent at its back such vent would preferably be connected directly to the vent pipe 24.

Figure 4:
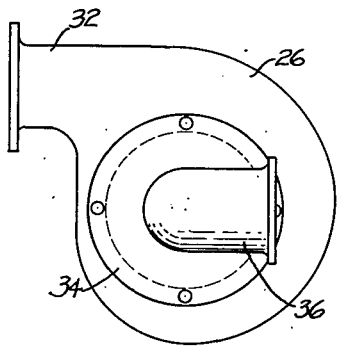
Figures 4 and 5 are views from opposite sides of the blower of Figure 2.
Figure 5:
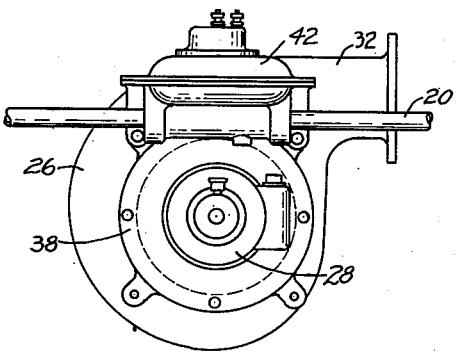

Figures 4 and 5 illustrate the blower more particularly as including a spiral casing having a tangential outlet 32 and open ends. One end is closed by a plate 34 carrying a central inlet pipe 36 adapted for connection with the vent pipe 24 and the other end is closed by a plate 38 carrying the motor 28. As seen in Figure 5, the outlet 32 is arranged horizontally for connection to the stack 30.

Figure 6:
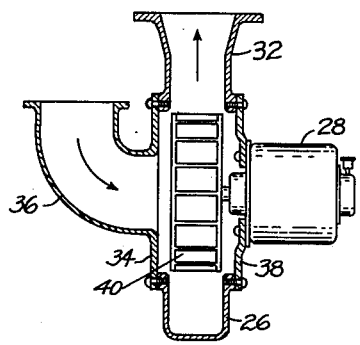
Figures 6 and 7 are a central section and a side view respectively of a modified blower construction.
Figure 7:
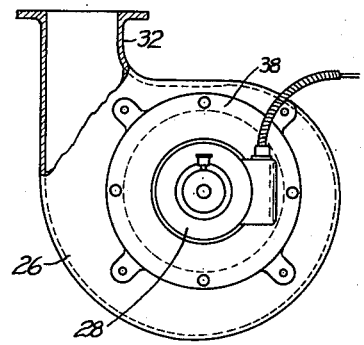

Figures 6 and 7 illustrate a variation in which the blower outlet is arranged vertically and for the sake of brevity of description parts therein corresponding to like parts in Figures 4 and 5 have been designated by the same reference numerals. Figure 6 also shows a centrifugal rotor element 40 having a series of radial vanes and connected directly to the motor shaft. When the rotor is turning, gas will be drawn in through the inlet 36 and discharged through the outlet 32 as will be understood.

According to the present invention, the motor 28 and blower 26 are controlled automatically by operation of the range so that the blower will operate only when one or more of the range burners is turned on. This may be effected by providing an automatic control device 42 in the gas supply line 20 to control the motor in accordance with variations in the rate of gas flow.

The automatic control device 42 comprises a split casing to support a flexible diaphragm 44 between its halves and having mounting brackets 46 by which it may be secured to the blower 26. The diaphragm 44 carries a tubular sleeve 48 slidably fitting over a tube 50 carried by a partition 52 which divides the casing into an inlet chamber 54 and an outlet chamber 56. A series of openings 58 are provided in the tube 50 adapted to be closed by the sleeve 48 when it is in the lower position shown in Figure 8 and to be open when the sleeve is raised.

The motor is controlled by a mercury switch 60 mounted on a lever 62 which is pivoted at one end to the casing of device 42 and is linked at its other end to the diaphragm. The switch may be connected with a pair of taps 64 which are adapted to be connected in the motor circuit.

Since it is not desired to operate the blower when only pilot burners or the like are burning, a by-pass 66 controlled by an adjusting screw 68 is formed in the partition 52. This may be adjusted to permit flow of any desired amount of gas to operate pilots or a gas refrigerator or to permit operation of a burner at low temperature without affecting the diaphragm, but will not pass enough gas for normal cooking.

Figure 8:
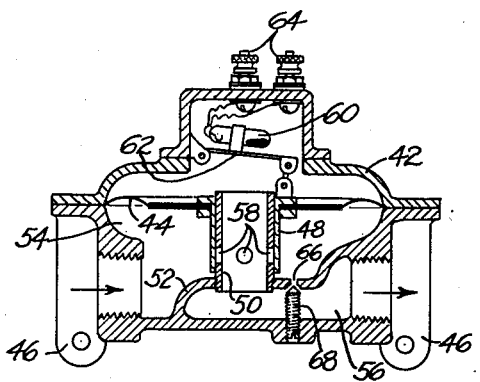
Figure 8 is a central section through the control device of Figure 2.
Figure 9:
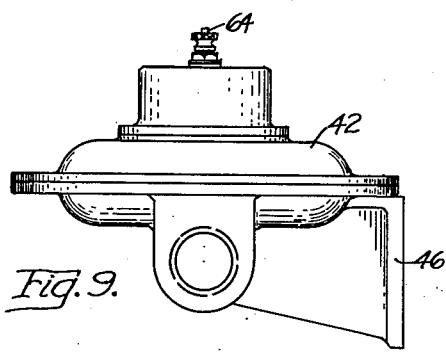
Figure 9 is an end elevation of the control device.

In operation with all of the range burners closed pressure on opposite sides of the diaphragm 44 is substantially equalized and the parts occupy the position of Figure 8 with the switch 60 open. If one or more burner valves are opened the pressure in the outlet chamber 56 and above the diaphragm will drop and the diaphragm will rise in response to the higher pressure on its lower side. This will tilt the switch 60 to closed position and at the same time uncover the ports 58 to permit flow of gas to the burners. At this time the diaphragm will be held raised by the pressure differential across the ports 58 which provide a restriction in the supply pipe.

As soon as the switch 60 is closed the motor 28 will start running to evacuate undesirable gases and vapors from the kitchen. Thus as long as the range is operating the blower will also be operating to remove cooking odors, heat, etc., so that the kitchen will always be cool and well ventilated. When the burner valves are closed the pressures on opposite sides of the diaphragm will be equalized and the parts will return by gravity to the position of Figure 8 to open the switch 60 and stop the blower.

While one embodiment of the invention has been illustrated and described in detail, it will be understood that it might be embodied in various other forms. It is therefore not intended to limit the scope of the invention to the form shown nor otherwise than by the terms of the appended claims.

What is claimed is:

1. In combination with a range or the like, a vent pipe communicating with the range and leading to a point remote therefrom, air circulating means in the vent pipe, means to supply gas to the range, and means responsive to the supply of gas to the range to control the air circulating means.

2. In combination with a range or the like, a vent pipe communicating with the range and leading to a point remote therefrom, air circulating means in the vent pipe, and means controlled by operation of the range to control the air circulating means.

3. In combination with a range or the like, a vent pipe communicating with the range and leading to a point remote therefrom, air circulating means in the vent pipe, means to supply gas to the range, and means responsive to the rate of supply of gas to the range to turn on the air circulating means when the supply rate exceeds a predetermined amount.

4. In combination with a range or the like and a hood therefor, a vent pipe communicating with said hood and leading to a remote point, air circulating means in the vent pipe, and means automatically operable in response to operation of the range to control said air circulating means.

5. In combination with a range or the like and a hood therefor, a vent pipe communicating with said hood and leading to a remote point, air circulating means in the vent pipe, means to supply fuel to the range, and means automatically operable in response to the rate of fuel supply to control the air circulating means.

6. In combination with a gas range having an oven and a hood, a vent pipe connected to the oven and the hood, air circulating means in the vent pipe, and a control device responsive to the supply of gas to the range to control the air circulating means whereby the oven and hood will be vented when the gas supply exceeds a predetermined minimum.

7. In combination with a gas range or the like adapted to rest on the floor of a room, a vent pipe extending through the floor and communicating with the range and discharging at a point outside of the room, air circulating means in the vent pipe, a gas supply pipe connected to the range, and a control device responsive to the rate of flow of gas through the gas supply pipe to control the air circulating means.

8. In combination with a gas range or the like having an oven and adapted to rest on the floor of a room, a vent pipe extending through the floor and connected to the oven and discharging at a point outside of the room, air circulating means in the vent pipe, a gas supply pipe connected to the range, and a control device responsive to the rate of flow of gas through the gas supply pipe to control the air circulating means.

9. In combination with a gas range or the like, a gas supply pipe connected to the range, a vent pipe communicating with the range and discharging at a point remote therefrom, air circulating means in the vent pipe, an electric motor driving said air circulating means, an electric switch controlling the motor, and a device in the gas supply pipe including a part movable in response to variations in the rate of flow of gas therethrough for operating said switch.

10. In combination with a gas range or the like, a gas supply pipe connected to the range, a vent pipe communicating with the range and discharging at a point remote therefrom, air circulating means in the vent pipe, an electric motor driving said air circulating means, an electric switch controlling the motor, and a device in the gas supply pipe including a diaphragm sensitive on its opposite sides to the gas pressure in opposite parts of the gas supply pipe and connected to said switch to operate the same.

11. In combination with a gas range or the like, a gas supply pipe connected to the range, a vent pipe communicating with the range and discharging at a point remote therefrom, air circulating means in the vent pipe, an electric motor driving said air circulating means, an electric switch controlling the motor, and a device in the gas supply pipe including a diaphragm sensitive on its opposite sides to the gas pressure in opposite parts of the gas supply pipe, a valve in the supply pipe connected to the diaphragm to be operated thereby, and a connection between the diaphragm and the switch.

12. In combination with a gas range or the like, a gas supply pipe connected to the range, a vent pipe communicating with the range and discharging at a point remote therefrom, air circulating means in the vent pipe, an electric motor driving said air circulating means, an electric switch controlling the motor, and a device in the gas supply pipe including a diaphragm sensitive on its opposite sides to the gas pressure in opposite parts of the gas supply pipe, a valve in the supply pipe connected to the diaphragm to be operated thereby, a by-pass opening around said valve, and a connection between the diaphragm and the switch.

13. In combination with a gas burning device mounted in a room, a vent pipe opening into the room and extending outside thereof, blower means to circulate air from a point in the room adjacent said device through said pipe to a point outside the room, gas supply means for said device, and control means responsive to the rate of gas supply to control said blower means.

JAMES G. AMES.